US007065614B1

(12) United States Patent
Vartti et al.

(10) Patent No.: US 7,065,614 B1
(45) Date of Patent: Jun. 20, 2006

(54) SYSTEM AND METHOD FOR MAINTAINING MEMORY COHERENCY WITHIN A MULTI-PROCESSOR DATA PROCESSING SYSTEM

(75) Inventors: Kelvin S. Vartti, Hugo, MN (US); James A. Williams, Mahtomedi, MN (US); Donald C. Englin, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 332 days.

(21) Appl. No.: 10/600,880

(22) Filed: Jun. 20, 2003

(51) Int. Cl.
*G06F 12/00* (2006.01)
*G06F 13/00* (2006.01)

(52) U.S. Cl. .................. 711/141; 711/135; 711/152; 711/159

(58) Field of Classification Search ............. 711/141, 711/119, 120, 121, 130, 133, 135, 147
See application file for complete search history.

(56) References Cited

U.S. PATENT DOCUMENTS 5,924,118 A * 7/1999 Arimilli et al. ............ 711/130
6,240,490 B1 * 5/2001 Lyles et al. ................ 711/141
6,647,453 B1 * 11/2003 Duncan et al. ............ 710/306
6,678,798 B1 * 1/2004 Kuskin et al. ............. 711/141
6,792,507 B1 * 9/2004 Chiou et al. ............... 711/119
6,868,481 B1 * 3/2005 Gaither et al. ............. 711/119
6,973,548 B1 * 12/2005 Vartti et al. ................ 711/141
2003/0135669 A1 * 7/2003 Anderson .................... 710/22

* cited by examiner

Primary Examiner—Hong Kim
(74) Attorney, Agent, or Firm—Beth L. McMahon; Charles A. Johnson; Mark T. Starr

(57) ABSTRACT

The current invention provides a system and method for maintaining memory coherency within a multiprocessor environment that includes multiple requesters such as instruction processors coupled to a shared main memory. Within the system of the current invention, data may be provided from the shared memory to a requester for update purposes before all other read-only copies of this data stored elsewhere within the system have been invalidated. To ensure that this acceleration mechanism does not result in memory incoherency, an instruction is provided for inclusion within the instruction set of the processor. Execution of this instruction causes the executing processor to discontinue execution until all outstanding invalidation activities have completed for any data that has been retrieved and updated by the processor.

17 Claims, 5 Drawing Sheets

SYSTEM AND METHOD FOR MAINTAINING MEMORY COHERENCY WITHIN A MULTI-PROCESSOR DATA PROCESSING SYSTEM

RELATED APPLICATIONS

The following co-pending applications of common assignee have some subject matter in common with the current application:

Co-pending Ser. No. 10/601,030 entitled "System and Method for Handling Memory Requests in a Multiprocessor Shared Memory System", filed on even date herewith, and incorporated herein by reference in its entirety.

Co-pending Ser. No. 10/600,205 entitled "Data Acceleration Mechanism for a Multiprocessor Shared Memory System", filed on even date herewith, and incorporated herein by reference in its entirety.

FIELD OF THE INVENTION

The present invention relates generally to methods and apparatus for maintaining memory coherency within a multi-processor, shared memory system; and, more particularly, relates to a new instruction for use in maintaining memory coherency within a system that allows a requester to obtain memory data for update purposes before read-only copies of the data have been invalidated.

DESCRIPTION OF THE PRIOR ART

Data processing systems are becoming increasing complex. Some systems, such as Symmetric Multi-Processor computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory or from other cache memories. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a data item is copied, and subsequently modified, within a cache memory, another IP requesting access to the same data item must be prevented from using the older copy of the data item stored either in main memory or the requesting IP's cache. Additionally, if one IP updates a first, then a second portion of the memory, these updates must become visible to other IPs within the system in that order. This is referred to as maintaining cache coherency. Maintaining cache coherency becomes more difficult as more cache memories are added to the system since more copies of a single data item may have to be tracked.

One of the ways cache coherency is maintained is by invalidating old copies of data before data is provided to an IP. For example, assume a first IP requests a copy of data for update purposes, and another read-only copy of the data exists within the cache of a second IP. The read-only copy must generally be invalidated before a copy of this data is provided to the first IP. This ensures that an old copy of data is not used after the first IP has updated its new copy. One problem with this methodology is that is may take some time to invalidate the read-only copy, delaying processing activities of the first IP.

An alternative to imposing the foregoing limitation involves providing data to a requester such as an IP before older data copies have been invalidated. Some prior art systems have allowed this to occur while also maintaining coherency by utilizing a single memory channel to enforce ordered request and response processing. In these types of systems, a restriction is imposed whereby a memory request to invalidate a read-only data copy must be completed before the memory provides any data in response to a subsequently issued memory request. This restriction guarantees memory coherency is maintained. The request/response ordering is accomplished by virtue of the fact that the memory includes a single memory channel to handle both memory requests and memory responses.

The single-channel memory architecture discussed above limits memory throughput. This is because all requests and responses must be processed by the same logic. A more efficient approach utilizes a split-channel architecture that allows requests from the memory to be processed at the same time as the memory responds to requests from units within the system. However, prior art systems did not implement this methodology because of the challenges associated with maintaining memory coherency.

What is needed, therefore, is an improved system for supporting a split-channel memory architecture that includes dedicated request and response processing logic. The system preferably allows data to be acquired from memory before other read-only copies of the data are invalidated. The system must further ensure that memory coherency is maintained.

SUMMARY OF THE INVENTION

The current invention provides a system and method for maintaining memory coherency within a multiprocessor environment that includes multiple requesters such as IPs coupled to a shared main memory. Within this environment, each IP may initiate retrieval of data from the memory. This retrieved data may be stored within one or more caches accessible to the IP. When data is retrieved from the memory for update purposes, other read-only copies of the data that may be stored elsewhere within the system must be invalidated. According to the system of the current invention, data may be provided to an IP for update purposes before all other read-only copies of this data have been invalidated.

To ensure that the acceleration mechanism described above does not result in memory incoherency, a novel instruction is provided for inclusion within the instruction set of the processor. Execution of this instruction causes the executing processor to stall until all outstanding invalidation activities have completed for any read-only copies of data that may have been updated by the processor since its retrieval from memory. This prevents memory incoherency problems that may result if that processor initiates inter-processor communications such as an Inter-Processor Interrupt (IPI) before the invalidation activities are completed. This is discussed further below.

The memory system employed within the context of the current invention includes both request and response channels. As noted above, this allows memory data to be provided to an IP for update purposes via the response channel before other read-only copies of that data that are stored elsewhere within the system have been invalidated. Invalidation of these read-only copies is accomplished by issuing one or more invalidation requests via the memory request channel. Memory coherency is maintained, in part, by preventing an IP from storing any data back to memory until all invalidation activities that may be directly or indirectly associated with that data have been completed. Completion of these invalidation activities is signaled by an acknowledgement that is issued by the memory to the unit that issued the original request for the data.

In one embodiment of the system, the memory is coupled to multiple processing nodes, each associated with one or more IPs. When the memory issues an acknowledgement, it is sent to the processing node that includes the IP that initiated the original data request that ultimately resulted in the acknowledgement. Logic within the processing node tracks all outstanding acknowledgement indications. If an IP attempts to write data back to memory, this logic will prevent the data transfer if, at that moment in time, any outstanding acknowledgements exist on requests issued by that IP, or any other IP that may have updated that data. The data transfer can complete when the outstanding acknowledgements have been received.

In the system of the current embodiment, the acknowledgement tracking is performed by processing node logic that is not directly visible to the IPs included within the node. That is, a particular IP does not have direct visibility into whether any outstanding acknowledgements exist for requests that it, or another IP within the processing node, may have issued. In some instances, this visibility is required to ensure that an IP does not initiate inter-processor communications that will cause another IP in the system to reference an outdated copy of data. For example, a first IP may update data, then issue an IPI to a second IP to indicate that this updated data is available for use. When the second IP receives the IPI, it is critical that all invalidation operations have completed for the updated data. If this is not the case, the second IP may utilize the outdated data rather than the updated copy.

The current invention provides an instruction that prevents an IP from continuing execution until predetermined outstanding invalidation activities have been complete. According to one embodiment, the novel instruction, which is part of the instruction set of the IP, is a lock-type instruction that performs a test-and-set operation on a lock cell stored within main memory. Access to the lock-cell is not granted until all of the predetermined outstanding invalidation activities have been completed. These predetermined activities include those that are associated with requests for any memory data that were issued by the IP that is executing the instruction. The activities further include those that are initiated because of requests for any memory data that were issued by predetermined other IPs included within the processing node. These predetermined other IPs include all IPs that supplied data to the IP that is executing the novel instruction.

The current instruction can be executed by an IP prior to the issuance of an IPI to ensure that this inter-processor communication does not result in memory incoherency.

According to one embodiment, a memory coherency system is provided for use in a data processing system that has a memory coupled to multiple requesters. The memory coherency system includes a memory circuit coupled to provide a copy of requested data from the memory to a first requester, and to initiate invalidation operations to invalidate all read-only copies of the requested data that are stored by one or more other requesters. The memory coherency system further includes a circuit within the first requester that is responsively coupled to the memory circuit to execute an instruction that causes the first requester to temporarily enter a stalled state until all of the invalidation operations have been completed.

According to another aspect of the invention, a system is provided for managing requests within a data processing system. The system includes means for providing data in response to a request before all read-only copies of the data that reside within the data processing system at the time of receipt of the request have been invalidated. The system further includes means for selectively discontinuing predetermined data processing tasks until all of the read-only copies have been invalidated.

In another embodiment, a method for controlling processing of requests is provided for use in a system having multiple requesters coupled to a shared memory. The method comprises issuing a request for data by a requester to the shared memory, providing the data from the shared memory in response to the request before all read-only copies of the data retained by other requesters have been invalidate, and stalling the requester until all of the read-only copies have been invalidated.

Other scopes, aspects, and embodiments of the current invention will become apparent from the following description and the accompanying drawings.

DETAILED DESCRIPTION OF THE DRAWINGS

A. Description of the System Platform

Figure 1:
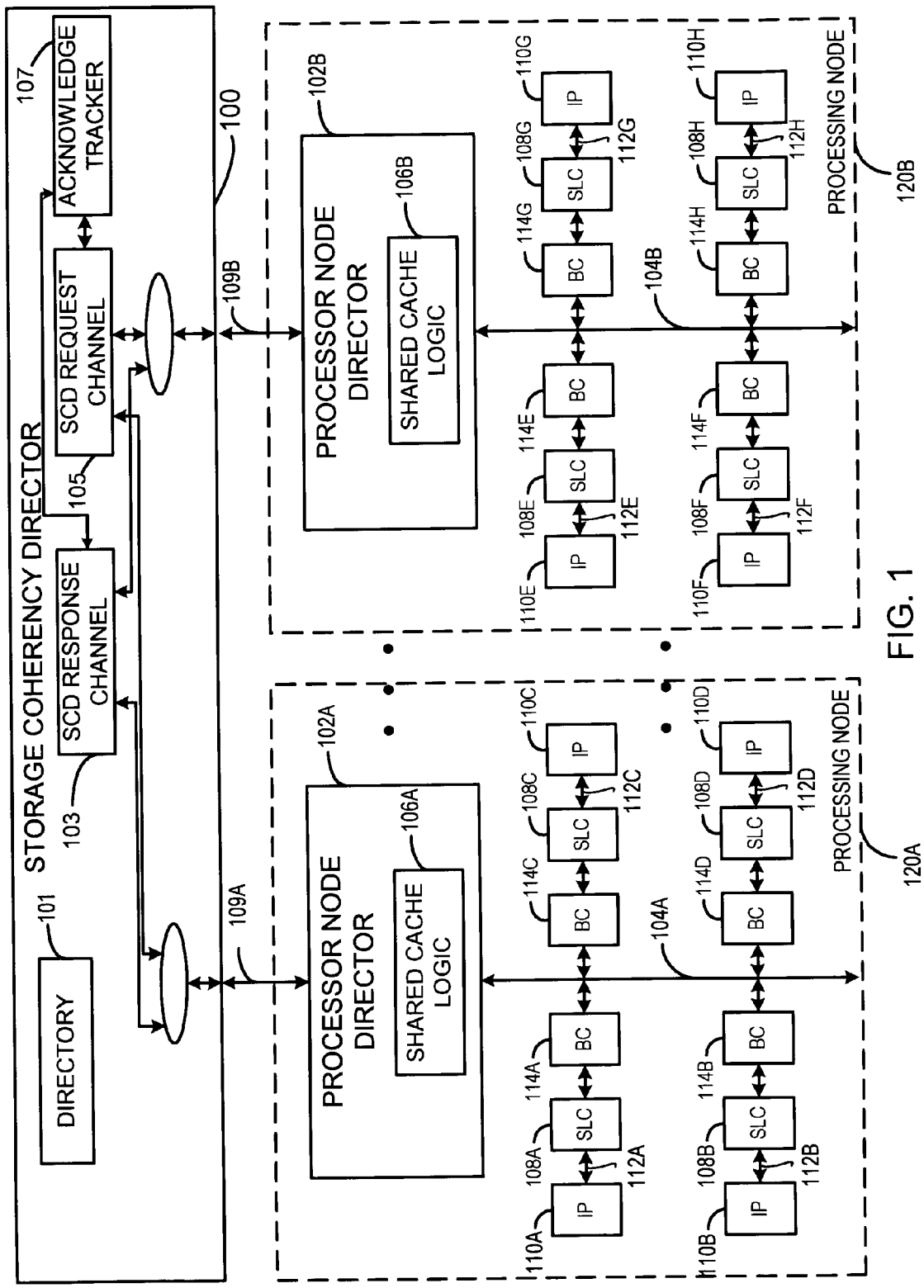
FIG. 1 is a block diagram of an exemplary data processing system of the type that may employ the current invention.

FIG. 1 is a block diagram of an exemplary data processing system that may employ the current invention. The system includes a Storage Coherency Director (SCD) 100 that provides the main memory facility for the system. SCD 100 may include random access memory (RAM), read-only memory (ROM), and any other type of memory known in the art. SCD 100 may be subdivided into multiple subunits (not shown) in a manner largely beyond the scope of the current invention. In one embodiment, SCD is a directory-based storage unit. In this embodiment, SCD retains information in directory 101 that indicates where the latest copy of requested data resides within the system. This is necessary since data from SCD 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the SCD, where a 128-byte block is referred to as a cache line.

The SCD of the current embodiment includes a SCD response channel 103 and an SCD request channel 105. The SCD request channel 105 is coupled to an acknowledge tracker. The use of these channels and the acknowledge tracker is discussed below.

SCD is coupled to one or more Processor Node Directors (PND) shown as PNDs 102A and 102B. The system of the current invention may include more or fewer PNDs than are shown in FIG. 1. Each PND is coupled to SCD 100 over one or more high-speed SCD interfaces shown as 109A and 109B that each includes data, address, and function lines.

Each PND includes logic to interface to the high-speed SCD interface, and further includes logic to interface to a respective processor bus such as processor buses 104A and 104B. These processor buses can employ any type of bus protocol. Each PND may further include shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B. Each processor bus further couples to multiple local cache memories through respective Bus Controllers (BCs). Each BC controls the transfer of data to and from the processor bus in a manner that conforms to bus protocol. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another embodiment, these local caches may be Third-Level Caches.

Each SLC 108 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A–114D, SLCs 108A–108D, and IPs 110A–110D may be referred to as processing node 120A. Similarly, PND 102B, processor bus 104B, and all entities associated with processor bus 104B comprise a second processing node 120B. Other processing nodes may exist within the system.

During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request that is driven onto processor bus 104A by BC 114A. If any of these SLCs has a modified copy of the requested cache line, it will be returned to requesting SLC 108A via processor bus 104A. Additionally, SLCs 108B–108D may have to invalidate any stored copies of the data depending on the type of request made by SLC 108A. This is discussed further below.

PND 102A also snoops the request from SLC 108A. In particular, PND 102A determines whether any other SLC responds to the request by providing modified data on processor bus 104A. If not, data that is retrieved from cache 206 of shared cache logic 106A is provided by PND 102A to SLC 108A.

In some instances, data requested by IP 110A is not resident within any of the cache memories associated with processor bus 104A. In that case, PND 102A must forward the request to SCD 100. SCD 100 determines the location of the current copy of the requested data using information stored within its directory 101. The most current copy may reside within the SCD itself. If so, the SCD provides the data directly to PND 102A via SCD response channel 103.

In some cases, request data is stored within another cache memory of a different processing node. In this instance, the way in which the request is handled depends on the type of request made by IP 110A, and the type of access rights that have been acquired by the other memory. If IP 110A is requesting "ownership" of the data so that a write operation can be performed, and further if another processing node 120 currently retains ownership of the data, the SCD issues a "port snoop and invalidate" request. In one embodiment, this type of request is issued via request channel 105, although in a different embodiment, this request may be issued on response channel 103. This request will cause the processing node to invalidate any stored data copies, and return updated data to SCD 100 so that this updated copy may be forwarded to PND 102A.

In another situation, the IP 110A may be requesting ownership of data that is retained by one or more other processing nodes 120 as read-only data. In this situation, an invalidation request is issued to these one or more processing nodes. The invalidation request causes the nodes to invalidate their copies of the data so that they may no longer be used. In one embodiment, this type of request is issued on response channel 103, although this need not be the case.

In still another scenario, IP 110A may be requesting read-only access to data that is retained with ownership privileges by another node. In this case, SCD 100 issues a "port snoop" request. In one embodiment, this request is issued via request channel 105 to cause the other node to return any updated data copy to SCD. This type of request could be issued on the response channel in an alternative embodiment. In a manner that is beyond the scope of the present invention, this node may in some cases retain a read-only copy of the data.

Any of the above-described request types may be issued by SCD 100 to a processing node or an SCD interface 109. Within a processing node, these requests are received by the respective PND 102. In one embodiment, this PND may determine, based on stored state bits, whether any of the SLCs 108 within the processing node stores a valid copy of the requested cache line. If so, a request will be issued on the respective processor bus 104 to prompt return of any modified data. Based on the scenario, this request may also result in invalidation of the stored copies, or the conversion of these copies to read-only data. Any updated data will be returned to SCD 100 so that the data may be forwarded to the requester.

As is discussed above, if a PND such as PND 102A is requesting data for the purposes of performing updates, and further if one or more other processing nodes within the system retain a read-only copy of the data, these read-only copies must be invalidated. Otherwise, processors within these one or more other processing nodes may utilize outdated copies of this data, causing data coherency problems. The SCD tracks that data copies have been invalidated as follows. First, the SCD issues an invalidation request to each of the processing nodes 120 in the system that retains a read-only copy of the requested data, as described above. Since the system of the current invention may include more than the two processing nodes, multiple invalidation requests may have to be issued. These requests are processed within the processing nodes in the manner discussed above. When a processing node has complete invalidation activities, it issues an invalidation acknowledgement to SCD via response channel 103.

Acknowledge tracker 107 tracks the processing of invalidation requests. Specifically, acknowledge tracker records every outstanding invalidation request that is issued for a given cache line. Each such request is matched to a subsequent invalidation acknowledgement. When acknowledge tracker determines that, for a given cache line, every processing node 102 that received an invalidation request has issued an invalidation acknowledgement to SCD 100, the invalidation operation is considered completed for that cache line.

In cases wherein one or more processing nodes 102 retain read-only copies of data, an up-to-date copy of the data also resides within SCD. Therefore, if SCD receives a request for this data, SCD could provide this data directly to the requester even before acknowledge operations are completed. Even though this is theoretically possible, most prior art systems have not allowed such expedited request processing to occur because it could result in memory coherency problems. Instead, most systems require that invalidation operations be completed before the request for the data is processed.

One example of the type of coherency problems that may be caused by providing data prior to the completion of invalidation involves lock cells. A lock cell is a variable that is used to control a software-lock to an associated shared resource such as shared memory data. The state of the lock cell indicates whether the software-lock and the associated, protected shared resource is currently activated by a software process, or "thread", that is executing on another processor. Generally, a thread activates the software-lock using a lock-type instruction. As is known in the art, this type of instruction first tests the state of the lock cell. If the state of the lock cell indicates the shared resource is available, the instruction then sets the lock cell to activate the software-lock to the executing thread. These test and set functions are performed during an indivisible operation by a single instruction. This prevents multiple processors from inadvertently gaining simultaneous access to the same lock cell.

The lock cell is generally stored within main memory. As noted above, this lock cell may be a software-lock associated with, and protecting, shared data. By software convention, the shared data must not be accessed without first gaining authorization through the software-lock. When the lock cell is acquired, the data protected by the lock cell may also be accessed.

If exclusive access is provided to one processing node on data that has not been invalidated by another node, a situation may arise wherein shared data may be accessed without adhering to appropriate lock convention. For example, assume the data is provided to PND 102A before a copy of this data is invalidated by the processing node of PND 102B. PND 102A updates the data, then updates the lock cell to the state that will allow PND 102B to re-gain access to the updated copy of the data. Both the lock cell and the updated data are flushed back to SCD 100. Assume processor 110E, which is executing a test-and-set instruction on the lock cell, gains access to this cell. However, because invalidation requests are not necessarily granted a priority level that is as high as other types of requests, the invalidation operation of the protected shared data has not been completed within SLC 108E and IP 110E's first-level cache at the time the lock cell has been acquired. As a result, processor 110E accesses the old copy of the protected shared data rather than obtaining the new data. Processing errors will result.

The types of processing errors described above would be avoided if the protected shared data were not provided to PND 102A until after completion of the invalidation operation for this data. For this reason, most prior art systems do not allow data to be provided to a requester before the invalidation operations are completed. Some prior art systems have maintained coherency while allowing data to be provided prior to the completion of invalidation operations by enforcing ordered request and response processing. This can best be understood by returning to the current example. Assume that an invalidation request is pending to PND 102B. This request must be completed before any subsequent response can be processed that will grant PND 102B access to a lock cell. In this manner, the outdated shared data copy is guaranteed to have been invalidated before PND 102B can acquire the lock cell. After the lock cell has been acquired, the updated data copy will then be obtained from SCD 100 and data coherency problems will be avoided.

Prior art systems enforce a request execution order by providing a single SCD channel to transmit requests and responses from SCD 100 to a PND 102. That is, in prior art systems, SCD response channel 103 and SCD request channel 105 would be replaced by a single channel. This ensures that an invalidation request provided to PND 102B is completed before SCD 100 grants PND 102B access to a lock cell.

In the current system shown in FIG. 1, a split response channel 103 and request channel 105 are provided. This split-channel configuration allows overall throughput to be increased, since more transmissions can be completed between SCD 100 and a PND 102 in a predetermined period of time. Moreover, higher priority data responses are allowed to by-pass lower priority invalidation requests, which can be beneficial in many circumstances. However, this by-pass capability results in the possible occurrence of the types of coherency problems discussed above.

The current invention provides a mechanism for maintaining coherency in a shared memory, multiple processor system that includes split request and response channels. The system includes a mechanism for tracking data within a PND 102 so that data provided to a PND 102 before one or more associated invalidation operations have concluded will not be written to the SCD until that operation is finally complete. This can best be understood by considering the following description and the accompanying drawings.

B. Description of the SCD and PND

Figure 2:
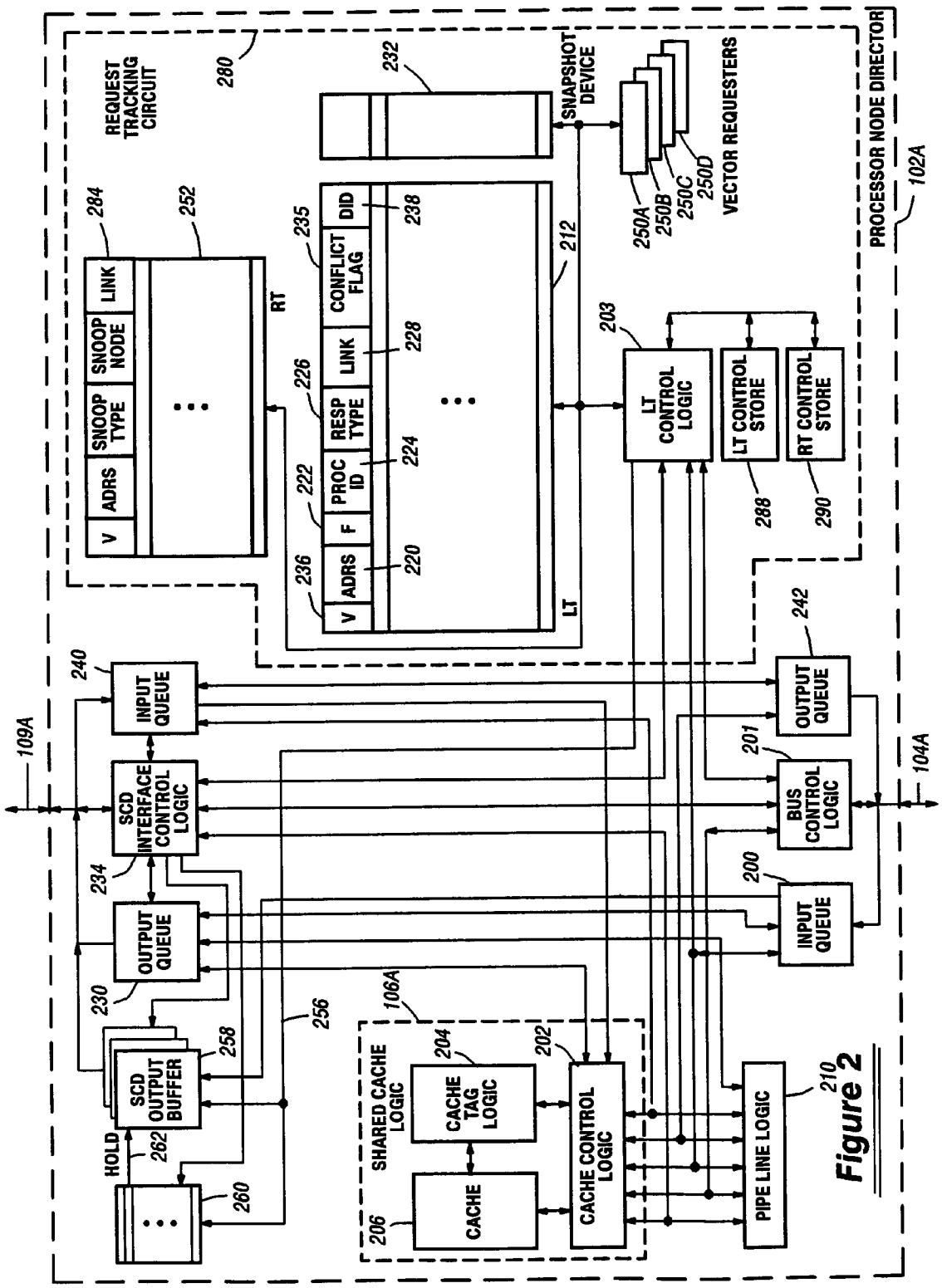
FIG. 2 is a block diagram of one embodiment of the PND according to the current invention.

FIG. 2 is a block diagram of logic within a PND 102 according to the current invention. Although PND 102A is shown and described, it will be understood that this discussion applies to any other PND as well. The logic of FIG. 2 includes a request tracking circuit 280 (shown dashed) that is provided to track outstanding invalidation operations so that data is not transferred from a PND in a manner that will cause memory incoherency.

This logic of FIG. 2 may best be understood by returning to the previous example. Assume that IP 110A acquires access to a lock cell associated with protected data. Thereafter, IP 110A makes a write request to the protected data. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request that is driven onto processor bus 104A by BC 114A. If any of these SLCs has a modified copy of the requested cache line, it will be returned to requesting SLC 108A via processor bus 104A. Additionally, SLCs 108B–108D may have to invalidate any stored copies of the data depending on the type of request made by SLC 108A. This is discussed further below.

PND 102A also snoops the request from SLC 108A. In particular, PND 102A determines whether any other SLC responds to the request by providing modified data on processor bus 104A. If not, data that is retrieved from cache 206 of shared cache logic 106A is provided by PND 102A to SLC 108A.

In some instances, data requested by IP 110A is not resident within any of the cache memories associated with processor bus 104A. In that case, PND 102A must forward the request to SCD 100. Before a request for a cache line can be presented to SCD 100, cache control logic 202 forwards information associated with the cache miss to Local Tracker (LT) control logic 203. LT control logic creates a request entry for the request within a storage device referred to as Local Tracker (LT) 212. LT 212 includes multiple addressable entries shown as entries 0 through N. In one embodiment, LT 212 includes storage space for sixty-four entries, although an LT of a different size may be utilized as well. Each entry may be addressed using an index value. For instance, LT entry 0 is addressed using an index value of "zero", LT entry 1 is addressed using an index value of "one", and so on.

Each LT entry includes multiple fields. An address field 220 stores the request address. In the current embodiment, this address will identify a cache line of memory within SCD 100, wherein a cache line is an addressable contiguous memory portion containing 128 bytes. In another embodiment, any other contiguous portion of memory may be identified by the address. The LT entry further stores a field 222 that identifies a request type. In this example, the request is a write request. The types of requests that may be tracked are largely beyond the scope of the invention, and will not be discussed in detail. Also included is a processor ID field 224 indicating which processor issued the request. In the current example, processor 110A is identified within this field. An additional response type field 226, which is initially left unused, is used to track request responses in a manner to be discussed below. A link field 228 is provided to link the current LT entry to any subsequently created entry associated with a request for the same cache line. In one embodiment, the link field may be set to the index value that identifies the latter-created LT entry. Requests are linked in this manner to prioritize requests for the same cache line according to time-order, and to prevent PND 102A from issuing two simultaneously-pending requests for the same cache line to SCD 100. Each LT entry further includes a conflict flag 235, which will be used in the manner discussed below to maintain memory coherency. In the current example, this flag is left unused. Finally, each LT entry includes a valid bit in field 236 that is set when a valid entry is created within LT 212. This valid bit is cleared when the entry is later removed from the LT.

After a request entry is made within LT 212, the associated request is transferred from input queue 200 to SCD output queue 230. A transaction identifier is included with the request. This transaction identifier is set to the index value for the LT entry that is tracking this request. This transaction identifier will be used to match a response from SCD 100 with the request information stored within LT 212, as will be described below. When the request gains priority, the request and transaction identifier are transferred via interface 109A to SCD 100 for processing.

After SCD receives a request, directory 101 is referenced to determine whether any of the one or more other nodes within the system stores a read-only copy of the requested data. If not, the requested data is provided to PND 102A along with the original transaction identifier and a response type of ownership-with-data. This response type indicates that data is provided with the response, and no invalidation response is outstanding for the current request. Because this response will not be followed by any subsequent action on the part of SCD 100, the transaction identifier is used to remove the request entry for the current request from LT 212. This is accomplished by clearing that entry's valid bit in field 236. The data returned from SCD 100 is provided to IP 110A, and may also be stored within shared cache logic 106A.

In another scenario, after SCD receives the ownership request, directory 101 indicates that a read-only copy of the requested data is retained by one or more processing nodes within the system. As a result, one or more invalidation operations must be performed. According to the current invention, rather than waiting for these operations to be completed, the data is provided immediately to PND 102A via SCD response channel 103 and interface 109A. SCD provides this data along with the original transaction identifier, and a response type of data-with-invalidate-pending, which indicates that the data is being provided before the invalidation operations have been completed. Also at approximately this time, SCD 100 issues invalidation requests. In one embodiment, these requests are issued via SCD response channel 103 to each of the one or more PNDs 102 that retains a read-only copy of the data. In this example, these PNDs will be assumed to include PND 102B and one other PND that is coupled to SCD 100 (not shown in FIG. 1).

During the time the invalidation requests are issued, PND 102A may receive the response, including the requested data, from SCD 100. This data is transferred from SCD input queue 240 to output queue 242 so that it can be forwarded to the requesting IP, which in this case is IP 11A. The IP thereby gains ownership of the cache line and can proceed with read and/or write operations. This data is also provided to pipeline logic 210, which initiates a request to cache tag logic 204 to update the tag information and store the data within shared cache logic 106A. Finally, the transaction identifier provided with the response is used by LT control logic 203 to update the appropriate entry within LT 212. In particular, LT control logic 203 sets response type field 226 for that entry to indicate a response of data-with-invalidate-pending was received from SCD 100 for this request. IP 110A is now considered an invalidate-pending processor, since at least one valid entry is stored within LT 212 with a response type of invalidate-pending for IP 110A.

In addition to LT 212, the current embodiment provides several other storage devices to store information that is used to track invalidate-pending responses. These storages devices include vector registers 250A–250D. Each of these registers stores information associated with invalidate-pending responses that have been received for a respective one of IPs 110A–110D. For example, vector register 250A stores information associated with invalidate-pending responses that have been received as the result of requests issued by IP 110A, and so on. In the current example, vector register 250A is updated, since the current invalidate-pending response was received because of a request issued by IP 110A.

The information stored within a vector register may be referred to as an "invalidate-pending" vector. This vector indicates which valid request entries exist having a response type of invalidate-pending for IP 110A. For instance, assume that for IP 11A, the only valid request entry within LT 212 that includes a response type in field 226 of invalidate-pending is that entry that was created in the foregoing example. That is, no other request entry exists within LT 212 for IP 110A with field 226 set to invalidate-pending. Further assume that this request entry happens to be stored within the second entry of LT 212. The corresponding invalidate-pending vector will therefore indicate that the second entry of LT 212 is the only request entry that is associated with an invalidate-pending response for IP 11A. If any other request entry having a response type of invalidate-pending existed for IP 110A within LT 212, the additional LT entry will also be identified by the invalidate-pending vector.

In one embodiment, each invalidate-pending vector is a master-bitted vector that contains the same number of bits as there are storage locations within LT 212. Each of these bits corresponds to a respective one of the LT storage locations. In this particular embodiment, a first bit of the invalidate vector may correspond to the first LT storage location, and so on. Therefore, in the current example, a invalidate vector may be created having the second bit of the vector set to indicate that request entry in storage location "two" of LT 212 has a response type of invalidate-pending. All other bits in the vector are cleared in this example. Other embodiments are, of course, possible, including an embodiment that utilizes encoded values to record the invalidate-pending responses.

A invalidate vector is used to prevent data from exiting a processing node before all existing invalidate-pending entries that might be associated with that data have been cleared from LT 212. This will be discussed in detail below.

Assume that while PND 102A is processing the invalidate-pending response, invalidation requests have been issued to PND 102B and the other PND that retains read-only copies of the current cache line. Eventually PND 102B will complete its invalidation activities associated with this request, and an invalidation acknowledge will be issued by PND 102B on SCD response channel 103. Similarly, the other PND that is also performing an invalidation request for this same cache line will complete invalidation activities and respond to SCD with an invalidation acknowledge. Acknowledge tracker 107 is tracking all outstanding invalidation activities for each cache line that was previously returned with an invalidate-pending response. Tracking is performed using the transaction identifier that is discussed above. In particular, acknowledge tracker 107 of the current example will determine when invalidation acknowledge responses have been returned from PND 102B, and from the other PND 102. When these two responses have been received, SCD response channel 103 issues an acknowledgement that is referred to as an invalidate-complete response via interface 109A to SCD input queue 240 of PND 102A. This response includes the transaction identifier provided with the original request.

When SCD input queue 240 receives the invalidate-complete response, it is provided to LT control logic 203 along with the accompanying transaction identifier. LT control logic utilizes the transaction identifier to address LT 212 and obtain the associated request entry, which will have a response type in field 226 of invalidate-pending. Because the outstanding invalidate-complete response has been received for this request entry, this request entry may now be removed from LT 212 by clearing the valid bit for that entry. Returning to the current example, this involves clearing the valid bit for the entry stored in LT location "two".

In addition to clearing the associated request entry within LT 212, LT control logic 203 also employs the invalidate-complete response to update the invalidate vectors. Specifically, the invalidate vectors are updated so they no longer track the invalidate-pending response recorded by LT entry "two". This can be best understood by considering the particular embodiment discussed above wherein master-bitted invalidate vectors are used to track the valid LT request entries that have a response type of invalidate-pending. Recall that using that embodiment in the current example resulted in the creation of an invalidate vector having bit "two" set to track the request in LT entry two. This vector was stored within vector register 250A for IP 110A, since IP 110A initiated the request that resulted in the invalidate-pending response. Now that the invalidate-complete response has been received for this request, the request entry does not need to be tracked. Therefore, LT control logic 203 used the transaction identifier of "two" to clear bit "two" of that vector within vector register 250A. Additionally, bit "two" is cleared in all other vectors stored within vector registers 250B–250D. This is necessary because these other invalidate vectors may have inherited the conflict recorded by vector register 250A, as will be discussed in detail below.

Finally, the invalidate-complete response causes LT control logic 203 to access a snapshot device 232. The snapshot device 232 is used to store snapshots of the vector registers 250A–250D. These snapshots are taken because certain data transfer operations have occurred within the processing node, as is discussed below. It is sufficient at this point to note that LT control logic 203 employs the transaction identifier of the invalidate-complete response to clear every record of the associated invalidate-pending response that may be stored within snapshot device 232. In one embodiment in which the snapshot device stores master-bitted vectors of the type stored within the vector registers, the transaction identifier is used to clear the respective bit for all vectors stored in the device. In the current example, the transaction identifier is used to clear bit "two" of every vector stored within snapshot device 232.

Requests to memory are tracked in the manner discussed above, using invalidate-pending responses, and subsequent invalidate-complete responses. The manner in which the tracking is affected by the various data transfer operations that can occur within a processing node are discussed in detail in the following paragraphs.

Write Back (WB) Operations

A Write Back (WB) operation involves transferring data from an SLC 108 to a PND 102 because that data is no longer needed by the associated IP 110. Returning to the current example, assume that the cache line discussed above has been provided to, and is still retained by, IP 110A, but the invalidate-complete response for this cache line has not yet been received by PND 102A. At this time, SLC 108A transfers the cache line back to PND 102A during a WB operation that is initiated because IP 110A no longer requires access to the data. When this occurs, the cache line address and other information associated with the WB operation are originally stored within input queue 200 of PND 102A. Pipeline logic 210 initiates a request to cache control logic 202, which will, in turn, present the cache line address to cache tag logic 204. If cache tag logic 204 determines that a cache hit has occurred, the cache line data provided with the WB operation is stored within cache 206 and the tag information within cache tag logic 204 is updated.

After the reference to shared cache logic 106A has been performed, cache control logic 202 provides the cache line address to LT control logic 203 along with an indication that a cache hit occurred. LT control logic 203 uses the cache line address to determine whether an "invalidation conflict" exists. An invalidation conflict exists if the invalidate vector for IP 110A indicates that an invalidate-complete response is outstanding on at least one request associated with IP 110A. In one embodiment, this will be determined from the invalidate vector for IP 11A. That is, if at least one bit of the IP's invalidate vector is set, an invalidation conflict occurred. If this is the case, this cache line will not be written back to SCD 100 at this time.

Assume, for example, that LT entry "two" still exists recording that an invalidate-pending response was received for this cache line, and that the associated invalidate-complete response has not yet been received. This entry will be reflected by the fact that the invalidate vector for IP 11A, which is stored within vector register 250A, is non-zero. Therefore, an invalidate conflict is said to have occurred for this operation. As a result, LT control logic 203 creates a special type of conflict entry within LT 212 for IP 110A that is differentiated from request entries by setting a conflict flag in field 235. This entry further includes address field 220, which stores the address of the cache line that was written to shared cache logic 106A. Processor ID field 226 stores an identifier indicating that IP 110A is the invalidate-pending processor. Link field 228 is used in the manner discussed above to link this entry to any future LT entry that is associated with the current cache line. Response type field 226 remains unused. Finally, a valid bit 236 is activated to indicate the LT entry is valid.

Recall that in this example, the original request entry for the cache line that is associated with the WB operation remains stored in LT entry "two" such that two LT entries now exist for the same cache line. In this special case scenario, link field 228 of the original request entry is set to point to the newly created conflict entry, since the two entries are tracking the same cache line.

The above example relates to the special case scenario wherein the WB operation is associated with a cache line address that is the same as an address recorded within a LT request entry. For this reason, the request entry is linked to the new conflict entry. It is important to note, however, that in the more general-case scenario wherein the WB operation is directed to a cache line that is not associated with an existing LT entry, an invalidate conflict would still exist because the invalidate vector for IP 110A is non-zero. In this general situation, a conflict entry is created within LT 232, but this entry is not linked to any previously created request entry.

At the time the conflict entry is created within LT 212, LT control logic 203 also creates an entry within snapshot device 232. In one embodiment, snapshot device 232 contains the same number of storage locations as is provided by LT 212. When a conflict entry is created within a storage location of LT 212, an entry is created within the associated storage location within snapshot device 232. In the current example, assume that the conflict entry for the WB operation is created within the third storage location of LT 212. The corresponding entry is therefore created within the third storage location of snapshot device 232, and so on.

Each entry within snapshot device 232 stores a snapshot reflecting the state of one or more of the invalidate vectors. In the current example, IP 110A is considered the invalidate-pending processor. Therefore, the vector stored within vector register 250A is retrieved and stored within the third storage location of LT 212. Recall that this vector indicates which LT request entries exist at this moment in time for IP 110A having a response type of invalidate-pending in field 226. This vector therefore provides a snapshot of all invalidate-complete responses that must be received by PND 102A before the cache line identified by the associated LT entry three can be allowed to exit the processing node. In the current example, it will be assumed that only bit "two" is set in vector register 250A. This indicates that only LT entry "two" records a response type of invalidate-pending for IP 110A.

Assume that after the conflict entry has been created in LT 212 and snapshot device 232 in the manner described above, the outstanding invalidate-complete response for the LT entry stored in LT storage location "two" is received from SCD 100. This invalidate-complete response is provided by SCD input queue 240 to LT control logic 203 in the manner discussed above. The transaction identifier provided with the invalidate-complete response is used to locate the associated request entry within LT 212, and LT control logic 203 removes the associated request entry from LT by clearing the valid bit in field 236, as was previously discussed above. At this time, this request LT entry is automatically unlinked from the subsequently created conflict LT entry for the same cache line.

In addition to addressing LT 212, LT control logic 203 references all of the vector registers 250A–250D to update the stored vectors. As discussed above, the transaction identifier is used to clear the associated bit within all of the master-bitted vectors. Similarly, the transaction identifier is used to clear the associated bit in every vector stored within snapshot device 232, as is discussed above. In keeping with the current example, every bit "two" in each of the vectors is cleared to indicate that the invalidate-complete response for the second LT entry has been received.

In some instances, clearing a bit of a invalidate vector will leave all bits of that vector cleared. This indicates that all outstanding invalidate-complete responses tracked by that invalidate vector have been received. For example, in the current case, recall that the invalidate vector that was stored within entry "three" of snapshot device 232 as a result of the WB operation included only one activated bit "two", which was set to indicate that the invalidate-complete response for LT entry "two" was outstanding. Following receipt and processing of the current invalidate-complete response, bit "two" of this invalidate vector will be cleared, indicating that no invalidate-complete responses are outstanding for the associated cache line. As a result, LT control logic 203 will automatically clear the corresponding LT entry "three" within LT 212 by clearing the valid bit in field 236. Assuming no other LT entries exist for this cache line, the cache line may now be aged from cache 206 as the cache management algorithm dictates. Alternatively, the cache line may be returned to SCD 100 if another processing node requests access to the cache line.

The foregoing discussion assumes that when the WB operation is performed, a cache hit occurs to cache 206 of shared cache logic 106A. If this is not the case, a different procedure is employed to process the WB operation. In this latter case, the data provided with the WB operation is transferred from input queue 200 to an available one of SCD output buffers 258 for temporary storage. In one embodiment, output buffers 258 include sixteen buffers, each capable of storing one cache line. Any other number and size of output buffers may be used in the alternative.

When the cache miss occurs, cache control logic 202 also provides the cache line address to LT control logic 203 along with an indication that a miss occurred. If a conflict is detected for IP 110A, as will occur in the current example because of LT entry "two", a conflict entry is created within LT 212 for the cache line. This entry records that IP 110A is the invalidate-pending processor in field 224 of the LT entry. This conflict entry is linked to the original request entry in the manner discussed above.

Because the conflict was detected, LT control logic 203 also provides control signals on lines 256 to create an entry within output buffer registers 260, which is a collection of registers used to manage any cache lines that are stored within SCD output buffers 258. This group of registers includes a register that is respectively associated with each of SCD output buffers 258. For example, the first SCD output buffer may be associated with the first output buffer register, and so on. In the current example, LT control logic 203 creates an entry in whichever output buffer register corresponds with the SCD output buffer that stores the current cache line. This entry stores a copy of the invalidate vector for IP 11A, since IP 110A initiated the WB operation. This invalidate vector, which is copied from vector register 250A, provides an indication of which request entries stored within LT 212 for IP 110A having a response type of invalidate-pending. Recall that in the current example, bit "two" of this vector is set. As long as at least one bit remains set in this vector, a hold line will be asserted on interface 262 that prevents the data stored within the associated one of the SCD output buffers 258 from being transferred from PND 102A to SCD 100.

As described above, the invalidate-complete response associated with LT entry "two" will eventually be received from SCD 100. As a result, LT control logic 203 will clear bit "two" in all vectors stored within vector registers 250A–250D, and all vectors stored within all output buffer registers 260. This clears all bits in the vector that controls release of the current cache line, and therefore the hold line on interface 262 is deactivated. As a result, the cache line that is stored in one of SCD output buffers 258 will be written back to SCD 100 during a port memory write operation that is completed under the control of SCD interface control logic 234.

Processor Bus Write Back (PBWB) Operations

A Processor Bus Write Back (PBWB) is another type of data transfer operation that may be performed across processor bus 104A. Returning to the current example, assume that the WB operation discussed above was not performed such that an updated copy of the current cache line still resides within SLC 108A for IP 110A. At this time, another IP such as IP 110B makes a request for the current cache line. BC 114A, which is snooping the bus, responds to this request by initiating an operation to invalidate the current cache line within SLC 108A. BC 114A then provides the updated cache line on processor bus 104A to IP 110B.

When BC 114A provides the cache line on processor bus 104A, this cache line is also stored within input queue 200 of PND 102A, and is forwarded to pipeline logic 210. Pipeline logic schedules a request to cache control logic 202 to determine whether the data is stored within cache 206. Cache control logic 202 also signals LT control logic 203 to determine whether any invalidate conflicts exist for the current cache line.

In one embodiment, LT control logic 203 has visibility as to which IP 110 received the data, which in this example is IP 110B. This processor becomes the new invalidate-pending processor for the cache line. This processor inherits all of the invalidate conflicts existing for every other IP 110A on processor bus 104A. In other words, all bits that are set within any of the other vector registers 250A–250D are copied into the vector register for the current invalidate-pending processor.

In the current example, and for simplicity, assume that there is only one entry within LT 212 having a response type in field 226 of invalidate-pending. This entry resides in LT location "two", as discussed above, and is reflected by a single bit "two" that is set within the invalidate vector stored within vector register 250A. No other conflicts are recorded within LT 212, as reflected by the fact that the vectors stored within vector register 250B–250D are all cleared. Therefore, when IP 110B inherits all conflicts from the other processors, LT control logic 203 effectively copies bit "two" from vector register 250A to the invalidate vector stored within vector register 250B. If other bits had been set in vector registers 250A, 250C or 250D, those bits would also be set in the invalidate vector for IP 110B.

As discussed above, the described embodiment requires that the new invalidate-pending processor inherits all conflicts in the system. This embodiment is adopted in a system wherein the identity of the previous invalidate-pending processor is not visible to the PND 102A. That is, PND 102A does not know which IP responded to provide the updated cache line to IP 110B. In an alternative embodiment in which PND is aware of which IP previously held the cache line, either from information stored within cache tag logic 204 or from data provided on processor bus 104A, the new invalidate-pending processor would be required to inherit conflicts only from the previous invalidate-pending processor, rather than from all processors. Returning to the current example, if PND 102A was provided with information indicating IP 110A was the previous invalidate-pending processor that provided the current cache line, IP 110B would be required to inherit only those conflicts existing for IP 110A, instead of inheriting conflicts from every processor. This latter embodiment may allow fewer conflicts to be inherited for a given cache line, which may allow the cache line to be release from a processing node more quickly.

After the invalidate vector for IP 110B is updated, and if any conflicts are recorded within vector register 250B for IP 110B, LT control logic 203 references LT 212 to create a new conflict entry. The conflict flag in field 235 is set, and the processor ID in field 224 is set to indicate IP 110B is the invalidate-pending processor. LT control logic 203 further creates an associated entry in snapshot device 232. This entry stores the vector that is copied from vector register 250B in the manner discussed above. The newly created LT entry will be cleared automatically when all bits of this vector are cleared by receipt of the corresponding invalidate-complete responses.

The above discussion relates to the case wherein the PBWB operation returns cache line data to PND 102A, and a hit to cache 206 results. In the case wherein a cache miss occurs but unused space exists within cache 206 such that a cache replacement operation can be performed, the cache line is stored within cache 206. Processing then proceeds as was discussed above for the PBWB cache hit scenario. That is, LT control logic 203 updates the invalidate vector for IP 110B, which is stored in vector register 250B. The updated vector reflects the fact that IP 110B has inherited conflicts from all other IPs 110A, 10C and 110D. If conflicts now exist for IP 110B, a new conflict LT entry is created for the PBWB operation, and the associated entry within snapshot device 232 copies the vector from vector register 250B.

In yet another scenario, the PBWB operation results in a cache miss, and a replacement operation cannot be performed. In this instance, the data provided with the PBWB operation is transferred from input queue 200 to an available one of SCD output buffers 258 for temporary storage. Additionally, cache control logic 202 provides the cache line address to LT control logic 203 along with an indication that a miss without replacement occurred. The invalidate vector for IP 110B is updated so that conflicts associated with the other processors are inherited by IP 110B. A new LT entry is created for IP 110B. This entry records that a PBWB operation occurred followed by a cache miss without replacement in field 222. An associated entry is also created within snapshot device 232 to store the invalidate vector copied from vector register 250B. Finally, LT control logic 203 copies the invalidate vector for IP 110B into the one of output buffer registers 260 that corresponds with the one of SCD output buffers 258 that stores the current cache line. As discussed above, because at least one bit of this invalidate vector is set, a hold line on interface 262 prevents the cache line from being written back to SCD 100. When all invalidate-complete responses associated with the invalidate vector have been received, the hold line will be deactivated, and the data will be transferred to SCD 100. The associated invalidate LT entry will also be removed in the manner discussed above.

SCD Port Snoop Requests

As discussed above, a SCD port snoop request is issued to a processing node to cause that node to return cache line data that was owned, and possibly updated, by the processing node. This type of request includes snoop requests, which are issued to allow a node to retain a read-only copy of the data while returning any data updates made while that data was retained with ownership. These requests also include snoop-and-invalidate (S&I) requests, which are issued to cause a processing node to invalidate all copies of the data, and return any data updates to SCD 100. The following paragraphs will provide examples related to S&I requests, although the processing of snoop requests are accomplished in a similar manner.

In response to receiving a S&I request, the PND will determine whether any SLCs 108 on its processor bus 104 retains a copy of the cache line, and if so, will request the invalidation and return of the data. PND will likewise invalidate any cache line copy stored within cache 206. PND then forwards the data, including any updates, to SCD 100. However, PND 102 cannot respond to a SCD port snoop request in this manner if some, or all, of the IPs in the processing node are invalidate-pending processors. This is best understood by example.

Assume that IP 110A and SLC 108A still retains the copy of the cache line discussed above. The invalidate-complete response of the current example has not yet been received for this cache line. At this time, SCD 100 issues a S&I request to PND 102A requesting return of a cache line. The requested cache line may be the same, or a different, cache line for which the response is pending. The reason a port snoop request may be received for a cache line that is associated with an outstanding invalidate-complete response is as follows. The SCD ensures that any outstanding invalidate-complete response is always issued before a snoop request is issued for the same cache line. Therefore, in a system having a single SCD channel, the invalidate-complete response will always be received by a PND before any port snoop request is received for that same cache line. However, in a dual SCD system, an invalidate-complete response is issued on SCD response channel 103, whereas a snoop request for a cache line that is owned by a processing node is issued on SCD request channel 105. Therefore, it is possible for a previously issued invalidate-complete response to be bypassed by a snoop request for the same cache line. This situation must be handled as described in the following paragraphs.

Returning to the current example, when the S&I request is received by PND 102A, it is stored within SCD input queue 240, and is later provided to output queue 242 of bus interface logic 205. This request eventually gains priority, and is issued onto processor bus 104A to determine whether any of the SLCs 108 stores an updated copy of the requested cache line. This request is also provided to pipeline logic 210, which generates a request to cache control logic 202 to determine whether the cache line resides within cache 206.

For discussion purposes, it will be assumed the S&I request is requesting the same cache line discussed in the above example, and for which an invalidate-complete response is still pending. It will further be assumed that SLC 108A retains a modified copy of the cache line. When a request is issued on processor bus 104A, SLC 108A provides the modified copy to PND 102A along with an indication that a "processor-bus-hit-with-modified-data" occurred. Further, assume that this cache line was not stored within cache 206 such that a cache miss occurred, and the cache is full such that the returned data cannot be stored within the cache. Therefore, this data is transferred from input queue 200 to an available one of SCD output buffers 258.

In the meantime, it is determined whether any invalidate conflicts exist for this cache line. If an invalidate conflict does not exist, the data may be returned to the SCD without delay. However, if a invalidate conflict exists, LT control logic 203 creates an entry in the one of output buffer registers 260 that corresponds with the SCD output buffer that stores the current cache line. This entry will store the invalidate vector which tracks the conflicts that exist for the cache line.

In one embodiment, the invalidate vector stored within the output buffer registers for the cache line is generated by "ORing" all invalidate vectors stored within vector registers 250A–250D. This is necessary in an embodiment wherein the identity of the processor that returned the data, which in this case is IP 110A, is not known to PND 102A. Therefore, the cache line stored within SCD output buffers 258 is tracked by a vector that inherits all invalidate conflicts from all processors in a manner similar to the way conflicts are inherited when PBWB operations are performed. In an alternative embodiment, the identity of the IP providing the returned cache line is known to PND 102A. This may be so because identity information is returned on processor bus 104A along with the data, or because that identity information is tracked within cache tag logic 204. In that case, the invalidate vector employed in the current scenario need only reflect those conflicts already associated with the identified processor.

In the manner discussed above, eventually all invalidate-complete responses associated with the invalidate vector will be received by PND 102A. In the current example, this involves receiving the invalidate-complete response for LT entry "two". When this response is received, LT control logic 203 will clear the only bit activated within the invalidate vector stored within the output buffer register for the current cache line. The hold line on interface 262 will be cleared, allowing the current cache line to be transferred from the SCD output buffers 258 to SCD 100 under the control of SCD interface control logic 234.

The foregoing discussion relates to an SCD snoop request that results in a processor bus hit with modified data, and a miss to shared cache logic 106A when no cache replacement operation is possible. In another scenario, the SCD snoop request results in a processor bus miss but a hit to shared cache logic 106A. This hit indication is transferred by cache control logic 202 to LT control logic 203, which determines whether an invalidate conflict exists. If an invalidate conflict is not detected, the data is provided from shared cache logic 106A to SCD 100 without delay. Otherwise, LT control logic creates a conflict entry in LT 212 in the manner discussed above. This LT entry will be linked to any request or conflict entry associated with the same cache line. In the current example, the cache line associated with the current S&I request is assumed to be the same cache line associated with LT entry "two". The newly created conflict entry is therefore linked to request entry "two". Additionally, an invalidate vector is stored within the associated entry of snapshot device 232. In one embodiment, this vector is obtained by "ORing" the contents of all vector registers 250A–250D. In another embodiment that records the identity of the most recent IP to update the requested cache line, the invalidate vector is set to the invalidate vector for that identified IP.

In addition to creating a conflict entry in LT 212, an entry is created in a Remote Tracker (RT) 252. This storage device is used to track all SCD snoop and S&I requests that must be deferred because of invalidate conflicts in those situations wherein the requested cache line is stored within shared cache logic 106A. In one embodiment, RT 252 is capable of storing sixty-four entries, although any other storage capacity may be utilized in the alternative. A RT entry includes information provided with the SCD snoop request such as the cache line address, the snoop request type, and the identity of the processing node that initiated the snoop request. This information is largely beyond the scope of the current invention, and is not discussed further. The newly created RT entry is linked to the LT conflict entry for this cache line by storing the number of the RT entry within link field 228 of the LT entry along with an indication that the linked entry is stored in RT 252 instead of LT 212.

In the current example, the invalidate-complete response for LT entry "two" will eventually be received. As described above, this will remove this request entry from LT, which will be unlinked from the conflict entry for this cache line. LT control logic 203 will also clear bit "two" of the invalidate vectors stored within vector registers 250A–250D and snapshot device 232. If this results in the clearing of any of the invalidate vectors stored within snapshot device 232, the associated conflict entry will be removed from LT 212. In the current example, this will result in removal of the most recently created conflict entry from LT 212. When this occurs, the RT entry will be unlinked from the LT entry.

For discussion purposes, it will be assumed that the RT entry is not linked to any further LT entries in a manner that will be discussed below. Since the RT entry is not so linked, it may be processed to complete the S&I request. According to one embodiment, the RT entry is removed from RT 252, and LT control logic 203 signals bus control logic 201 to re-issue the request for the cache line on processor bus 104A. Pipeline logic 210 will also initiate a request to cache control logic 202. These requests will result in a processor bus miss, and a hit to cache 206. LT control logic 203 will determine that all conflicts have been cleared for the current cache line, and the data from cache 206 will be forwarded to output queue 230 for transfer to SCD 100.

The embodiment described in the foregoing paragraph utilizes control mechanisms existing within the design to simplify return of the data to SCD 100. In another embodiment, the request need not be re-issued to processor bus 104A. Instead, removal of the RT entry may cause the cache line data to be provided directly from cache 206 to output queue 230.

In the foregoing example, it was assumed that the LT request entry was linked to a single conflict entry, which in turn, was linked to an entry stored within RT 252. It will be understood that one or more PBWB or WB operations may occur prior to receipt of the S&I request, resulting in the creation of one or more LT conflict entries for the same cache line. These entries will be linked in the manner discussed above. Upon receipt of the S&I request, yet another conflict entry is linked to the RT entry in the manner discussed above. Thereafter, it is possible that a subsequent request for the cache line may be made by an IP within the processing node so that a WB or PBWB operation occurs. This will cause an additional conflict entry to be created within LT 212. In this case, a pointer field in the RT entry is set to point to this new LT entry, which may, in turn, point to an additional LT entry, and so on. Thus, the sequence of entries for the same cache line may include multiple conflict entries. Because of SCD constraints dictating that, at most, one snoop request will be outstanding per cache line at any given time, this sequence will include, at most, one RT entry.

When an RT entry points to an LT entry, processing occurs generally as follows. When the RT entry is removed from RT 252, the cache line associated with the request is returned to SCD 100 in the manner discussed above. LT control logic 203 then unlinks the next LT conflict entry on the linked list by re-issuing a request for the cache line to processor bus 104A. Because the cache line was returned to SCD 100 during the previous transaction, this will result in a miss both to the processor bus 104A and cache 206. As a result, PND 102A will issue a retry response to processor bus 104A, causing this IP to re-issue the request for this cache line. When this request is re-issued, a request entry will be created within LT in the manner discussed above, and a request will be made to SCD for the cache line. This process effectively converts the conflict entry into a request entry. More details about processing an extended list of LT entries are provided in the Application entitled "System and Method for Handling Memory Requests in a Multiprocessor Shared Memory System", U.S. patent application Ser. No. 10/601, 030, filed on even date herewith, and referenced above.

The foregoing scenario discusses the case wherein a snoop request results in a processor bus miss and a cache hit 206. Similar processing will occur if a hit occurs to processor bus 104A, a miss occurs to cache 206, and the cache has storage space available to accommodate the storing of the data returned from processor bus 104A. In this case, the data is stored in cache 206, and LT and RT entries are created in the manner discussed above. When all associated invalidate-complete responses have been received, the LT and RT entries are removed from their respective storage devices, and the requested cache line is read from cache 206 to output queue 230 for transmission to SCD 100.

In yet other another case, the SCD snoop request will result in a processor bus hit with modified data, as well as a hit to shared cache logic 106A. In this scenario, if a conflict does not exist, the data within the cache is invalidated, and the data returned on processor bus 104A is forwarded to output queue 230 for transmission to SCD 100. If a conflict does exist, however, data returned from processor bus 104A is stored to cache 206. LT and RT entries are created in the manner discussed above. The cache line is returned to SCD 100 after all applicable invalidate-complete responses have been received.

Finally, in another scenario, both a processor bus miss and a miss to shared cache logic 106A may occur when the SCD snoop request is received. In this case, a snoop response is generated to SCD 100 indicating the cache line is no longer present within the processor node.

The above description considers a special case example wherein an S&I request is received from SND 100 for the same cache line that is already associated with a LT entry. This special case is considered to illustrate the manner in which linked lists of entries are created and handled. It will be understood, however, that similar processing steps are executed for S&I requests that request cache lines not associated with prior LT entries. That is, the same type of conflict processing as discussed above occurs, except that any LT conflict entry that may be created is not linked to a prior LT entry, but instead is only linked to the RT entry. Processing of data stored within SCD output buffers occurs in the manner discussed above.

From the foregoing description, one skilled in the art may appreciate that LT 212 may become full or nearly full if a large number of requests are being provided or received by a processing node within a predetermined period of time. In one embodiment, when a predetermined number of entries have been created within LT 212, a hold line is asserted on interface 109A. This hold line prevents any further requests from being transferred to, or received from, SCD 100 until a predetermined number of invalidate-complete responses have been received to clear entries within LT 212. When a predetermined number of locations are available within LT 212, the hold line is deactivated, and request processing continues in the manner discussed above.

The above discussion provides one exemplary embodiment of request tracking circuit 280. Those skilled in the art will appreciate that many alternative embodiments may be provided for this circuit. For example, LT 212, snapshot device 232, RT 252, and vector registers 250A–250D could be implemented using one, or any other number of storage devices. These storage locations need not be partitioned in the manner shown in FIG. 2. In addition, output buffer registers 260 could be included in these one or more storage devices.

The above-described system prevents a cache line from being transferred from a first processing node back to SCD 100 before all conflicts associated with the cache line have been cleared. Specifically, by storing a invalidate vector within snapshot device 232 at the time a PBWB or WB operation is performed, a "snapshot in time" is captured for the cache line. When this snapshot is created, PND 102A enters a "watch mode" for the cache line that is associated with this invalidate pending entry. As a result, the PND will not allow the associated cache line to leave the processing node until every invalidate-complete response associated with the snapshot has been received. This ensures that updates made by a first IP to multiple cache lines are not seen by another IP in an out-of-order manner. As discussed above, if this out-of-order access occurs, the types of coherency problems discussed above may occur. For example, access to a lock cell may be acquired before an old copy of data has been invalidated, resulting in an IP operating on this old data.

While the mechanism of tracking PData responses within an PND maintains memory coherency in most instances, some problems can still occur when Inter-Processor Interrupts (IPIs) are utilized. An IPI is an interrupt generated by a first processor to a second processor. In one scenario, for instance, a first IP 110 updates one or more cache lines of memory, which are written to SCD 100. This IP then issue an IPI to a second IP to indicate that these one or more cache lines may be referenced by the second IP. Assume that this second IP is located within another processing node 120 as compared to the first IP. Further assume that an invalidation requests from the SCD is pending to this other processing node for the one or more cache lines associated with the IPI. When the second IP receives the IPI, it is critical that all invalidation operations have been completed within the other processing node. If this is not the case, the second IP may utilize the outdated data rather than the updated copy that stored to the SCD by the first processor.

The PData tracking mechanism described above does not address the problems that may be caused when IPIs are utilized. This is because PData tracking is performed within an PND 102 rather than within an IP. Since an IP 110 has no visibility as to which invalidate-complete responses remain outstanding, an IP cannot determine when it is safe to issue an IPI. The current invention provides a system and method for stalling execution within an IP 110 until all outstanding invalidate-complete responses for that IP have been received within the associates PND 102. This is described below in reference to the following drawings.

C. Description of the IP and SLC

The current invention provides an instruction that is included within the hardware instruction set of an IP 110. In one embodiment, the instruction is implemented using a combination of hardware circuitry and microcode, although it may be implemented in software, or any combination of software, hardware, and/or microcode. Execution of this instruction will cause the IP to stall until the invalidate vector associated with that processor has cleared. For example, assume that IP 110A begins executing the new instruction. Execution of this instruction will not complete until all bits of the vector stored within vector register 250A for IP 110A are cleared. Thus, IP 110A is effectively stalled, and will not begin executing the next instruction in the instruction stream. After all invalidate-complete responses have been received by PND 102A for IP 110A, the IP continues instruction execution in the normal manner.

In one embodiment, the ENZ instruction of the current invention is a lock-type instruction that initiates a read operation to test an addressed lock cell stored within SCD 100. In one embodiment, this read operation requests both read and write access to the lock cell, requiring other copies of the lock cell to be invalidated within the system. As described above, the instruction is not allowed to complete execution until the invalidate vector that is associated with the executing IP is cleared.

The new instruction may be used to ensure that an IP does not issue an IPI until all outstanding invalidation operations have been completed for data retrieved by that IP. For example, assume a first processor initializes a buffer with data that is to be used by a second processor. Before the first processor issues an IPI to signal the second processor that the data is available for use, the first processor executes the novel instruction to ensure that all invalidation operations associated with the data have been completed. When the instruction completes, the first processor may issue the IPI without the threat that a memory coherency problem will result. An exemplary embodiment of this invention system and method is described in the following paragraphs in reference to the accompanying drawings.

Figure 3:
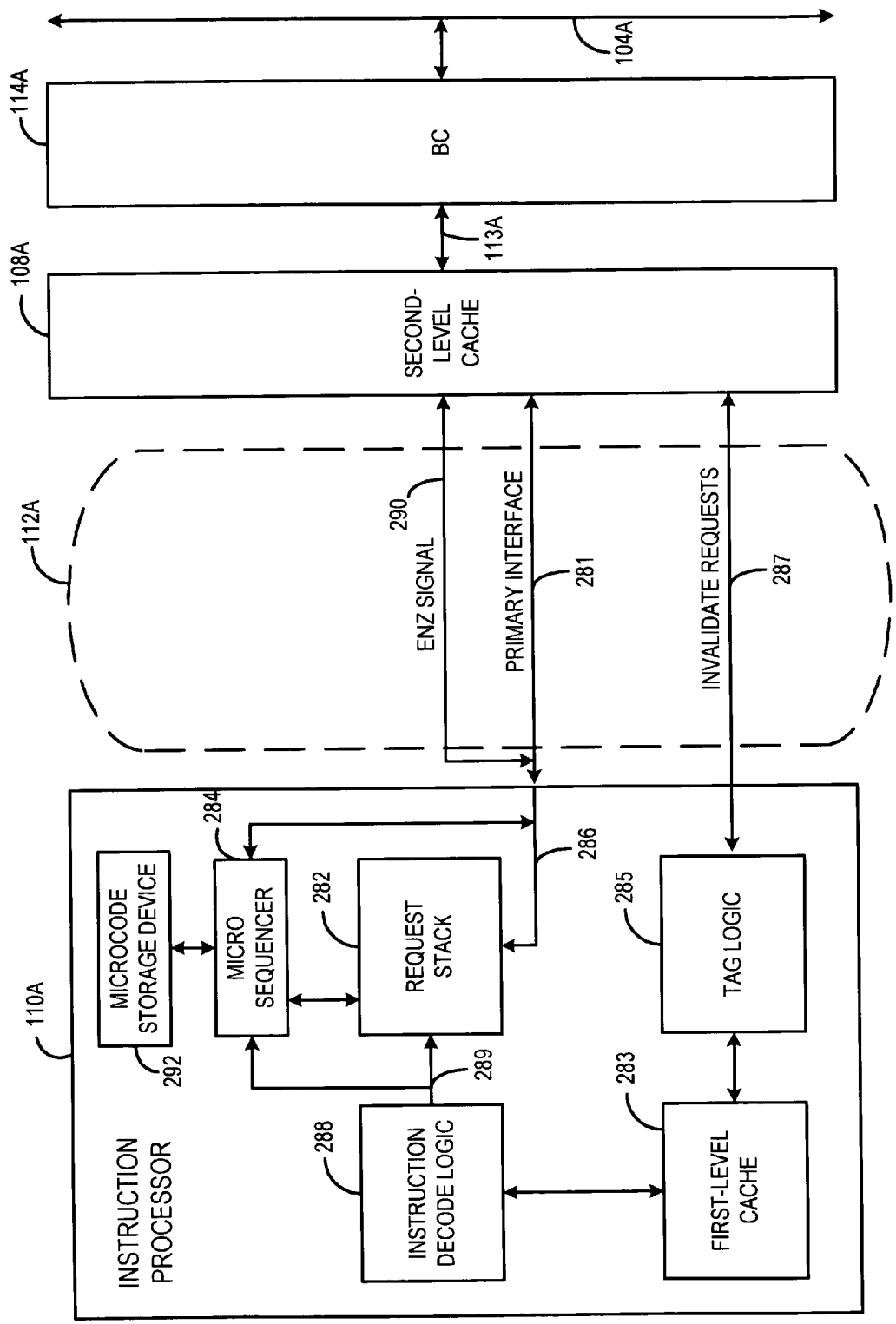
FIG. 3 is a block diagram of one of embodiment of an IP and an SLC according to the current invention.

FIG. 3 is a block diagram of IP 110A and SLC 108A, although it applies equally to all other IPs and SLCs in the exemplary data processing system. IP 110A is coupled via interface 112A (shown dashed) to SLC 108A. Interface 112A includes a primary interface 281 that supports data transfers between IP 110A and the SLC 108A for most data read and write operations. Primary interface includes an ENZ signal 290. This signal is employed to implement the novel instruction described above, and which is referred to as the "ENZ instruction".

IP 110A includes a First-Level Cache (FLC) 283 coupled to tag logic 285. The addresses of the cache lines stored within FLC are recorded by tag logic 285. When a cache miss occurs to FLC 283, the requested cache line is retrieved from SLC 108A, or from one of the other memories within the system via primary interface 281. Requests to invalidate a cache line stored within FLC 283 are received from SLC 108A via lines 287 of interface 112A.

Instructions are provided to instruction decode logic 288 from FLC 283 in the case of an FLC cache hit, or from SLC 108A in the case of a FLC cache miss. Instruction decode logic 288 operates in conjunction with microsequencer 284 to decode and execute these instructions. Some aspects of instruction execution may be controlled by programmable microcode bits stored within microcode storage device 292, which is referenced by microsequencer 284 during instruction execution. Instruction execution may require that operand data be retrieved from SLC 108A, as will occur if this data cannot be obtained from FLC 283. If this is the case, a request is queued within request stack 282.

In the case of the ENZ instruction, instruction execution will queue a request in request stack 282 for the lock cell data. This data will not be resident within FLC because, in the current embodiment, data associated with lock-type instructions such as the ENZ instruction is not stored within the FLC. When the request gains priority, it is transferred on primary interface 281. Because the ENZ instruction is being issued, the ENZ signal is activated on line 290 to SLC 108A. This signal is process by SLC 108A in a manner to be discussed in reference to FIG. 4.

Figure 4:
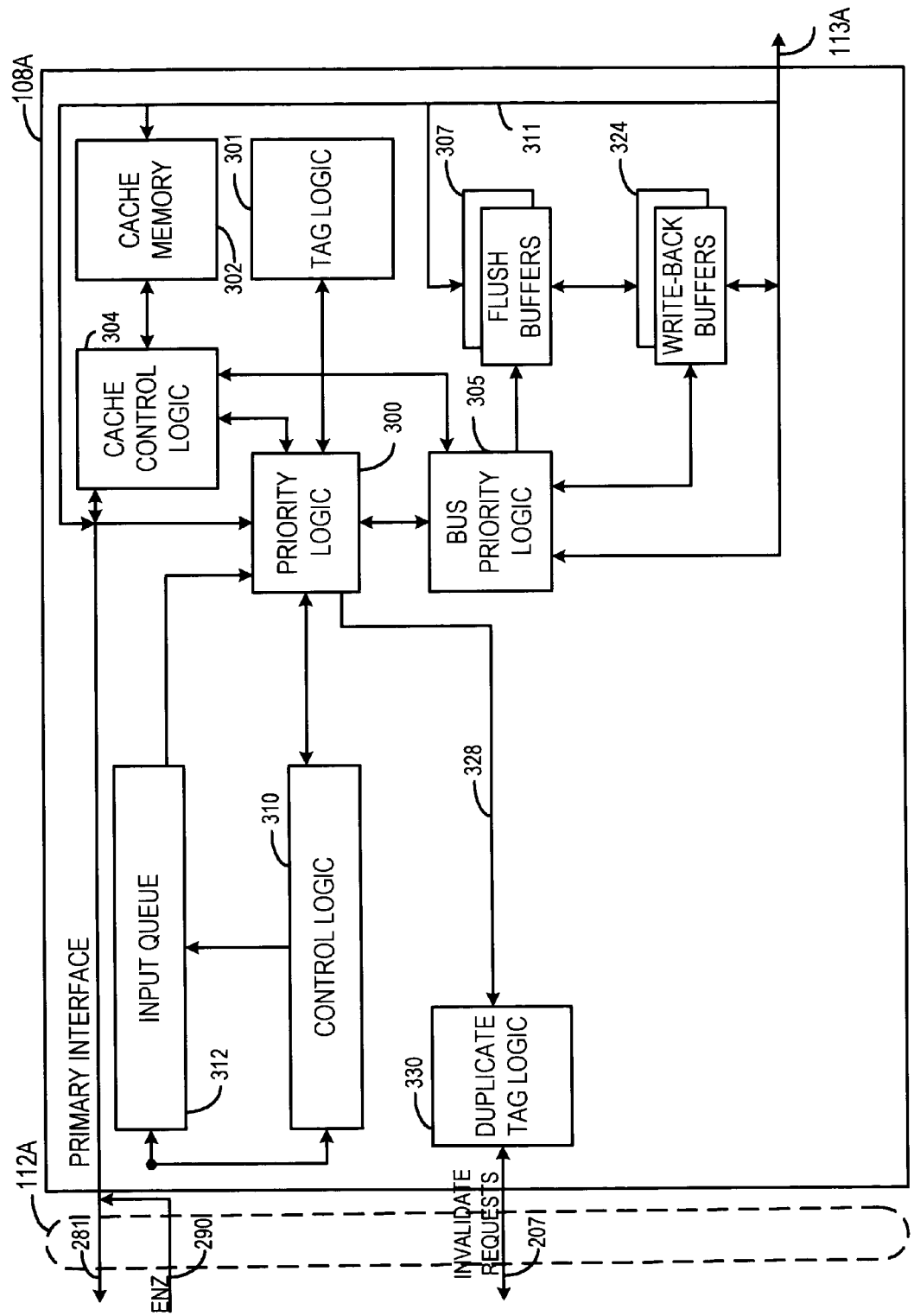
FIG. 4 is a more detailed block diagram of the embodiment of SLC shown in FIG. 3.

FIG. 4 is a block diagram of SLC 108A. While SLC 108A is shown and described, the following applies equally to each SLC 108 in the system. As discussed above, most read and write operations are performed over primary interface 281. This interface includes address, data, and function code signals that are provided to priority logic 300. Requests provided over primary interface may be stored within input queue 312.

Before discussing the specifics associated with the processing of the ENZ instruction, a general discussion of request processing is provided as follows. Requests stored within input queue 312 are provided to priority logic 300, which prioritizes them according to a predetermined priority scheme based on request type, as indicated by the function code signals. When a request gains priority, the request address is provided to tag logic 301 to determine whether the addressed cache line is resident within cache memory 302 of SLC 108A. At the same time, the request is forwarded by priority logic 300 to cache control logic 304. Cache control logic 304 performs a read and/or write operation to cache 302, as directed by the request function code signals. Data read from cache 302 is provided by cache control logic 304 to IP 110A via primary interface 281 if tag logic 301 determines that the cache line was resident within cache memory 302.

If the addressed cache line is not resident in cache 302 as indicated by tag logic 301, the original request is passed to bus priority logic 305, which prioritizes all requests that are scheduled to be transferred via interface 113A to BC 114A. BC 114A then issues the request to processor bus 104A. The other BCs 114B–114D are snooping processor bus 104A to receive this request, which is provided to the respective SLCs 108B–108D. If any of these SLCs 108B–108D stores a modified copy of the requested cache line, the data is returned to BC 114A on processor bus 104A.

While the request is being processed by SLCs 108B–108D, the request is also received by PND 102A, which is snooping processor bus 104A. PND 102A processes the request in the manner discussed above. That is, the requested cache line is retrieved from TLC 106A if a cache hit occurs. Then, if none of the SLCs 108B–108D returns an updated copy of the cache line on processor bus 104A, PND 102A provides the retrieved copy to SLC 108A. If a cache hit does not occur and the requested cache line is not resident within processing node 120A, the cache line is retrieved from SCD 100.

In any of the foregoing situations, the requested cache line is eventually returned via processor bus 104A, BC 114A and interface 113A to SLC 108A. The data will be written back to cache memory 302 over interface 311 during a replacement operation scheduled by priority logic 300. Additionally, the data is provided to IP 110A over primary interface 281.

When a cache line is to be flushed from cache memory 302 back to PND 102A or SCD 100 as may occur when that data is aged from the cache, the cache line is first copied from the cache memory into an available one of flush buffers 307. When the write operation gains priority, bus priority logic 305 controls the transfer of the cache line to an available one of write-back buffers 324 so that the data may be provided to BC 114A on interface 113A. BC 114A transfers the data to PND 102A via processor bus 104A using the appropriate bus protocol. If a cache hit occurs to TLC 106A, the cache line will be stored in this cache. Otherwise, the data will be transferred to SCD 100, as is described above.

The above description relates to the general processing that occurs during the execution of most read and write operations. When the ENZ instruction is executed, this general processing flow is modified as follows. Recall that when IP 110A executes an ENZ instruction, the ENZ signal on line 290 is asserted. This signal is provided to SLC 108A on primary interface 108A, where it is transferred to control logic 310. When the associated ENZ request gains priority, the ENZ signal is made visible by priority logic 300 to tag logic 301, cache control logic 304, and bus priority logic 305.

Recall that the ENZ instruction addresses a lock cell that will be used to perform an autonomous test-and-set operation. When the ENZ request gains priority, tag logic 301 determines whether the cache line containing the lock cell is stored within cache memory 302. If a cache miss occurs, processing proceeds as discussed above. That is, the address of the requested cache line is passed to bus priority logic 305 along with an indication that the ENZ signal is asserted. When this request gains priority, it is transferred to BC 114A via interface 113A. Because the ENZ signal is asserted, BC 114A makes a special type of bus request on processor bus 104A. In one embodiment, this special request is distinguished by placing a special read-invalidate indication on processor bus 104A. This is in contrast to other request types that are made by issuing a read-invalidate-with-ownership indication. Any other dedicated signal line or encoded signal value may be used to distinguish ENZ requests over other request types.

For current discussion purposes, it will be assumed that a "miss" occurs to processor bus 104A such that none of the other SLCs 108B–108D on processor bus 104A retains a modified copy of the requested cache line. Therefore, PND 102A will respond to the request. The read-invalidate indication of processor bus 104A is provided to bus control logic 201 of PND 102A to indicate that an ENZ request is being issued. In response, bus control logic 201 causes LT control logic 203 to reference vector register 250A. If a non-zero vector is stored within the vector register, a invalidate-complete response is outstanding for IP 110A. As a result, bus control logic 201 issues a response on processor bus 104A that causes the current request to be deferred. This means the request cannot be processed at this time. As a result, BC 114A will retry the request some predetermined time later. This retry process will continue until the invalidate vector clears for IP 110A. In the meantime, IP 110A is stalled waiting for the cache line data to be returned via primary interface 281.

When the invalidate vector for IP 110A has been cleared, indicating that all invalidate-complete responses for IP 110A have been received, LT control logic 203 signals cache control logic 202 to make a cache reference. Cache control logic 202 determines via cache tag logic 204 whether the cache line that is addressed by the ENZ instruction is resident in cache 206. If this cache line is resident, this cache line is returned to BC 114A via processor bus 104A. The cache line is forwarded on lines 311 to cache memory 302, where a replacement operation occurs under the control of bus priority logic 305, cache control logic 304 and priority logic 300. Additionally, the data is provided to IP 110A over primary interface 281.

Next, the data is provided to IP 110A. The IP reads this data, then provides a lock release indication on primary interface 281 to signal that execution of the ENZ instruction may be considered completed. In one embodiment, this indication is an encoded value that is forwarded to bus priority logic 305 to allow that logic to clear its lock sequence. In return, an acknowledge signal is provided on primary interface 281 to IP 110A, allowing the IP to consider the lock operation completed.

After execution of the ENZ instruction is considered complete, IP 110A may begin execution of the next instruction following the ENZ instruction in the instruction stream. IP 110A may now issue an IPI to another IP within the system without causing a memory coherency problem, since all invalidate-complete responses have been received for all cache lines written by IP 110A. This guarantees that all outdated copies of all cache lines that have been updated by IP 110A have been invalidated. Therefore, if an IPI is issued to signal another IP to begin execution on data stored within one or more of these updated cache lines, the other IP will not inadvertently begin referencing an outdated copy of the cache lines.

The foregoing discussion assumes that when PND 102A referenced cache 206 as the result of the ENZ request, a cache hit occurred. If a hit does not occur, cache control logic 202 causes SCD interface control logic 234 to generate a special ENZ-type request for the cache line to SCD 100. This request will be issued on interface 109A when it gains priority. In one embodiment, a special request indication known as a Port Read Invalidate Line (PRIL) is asserted on interface 109A because the request is of an ENZ-type. This differentiates an ENZ request from other request types that result in the assertion of a Port Read Invalidate Line with Ownership (PRILO) indication on interface 109A. This indication may be asserted using one or more dedicated signal lines, or alternatively, using encoded values.

When SCD 100 receives the ENZ request, SCD consults directory 101 to determine whether any processing node within the system retains a read-only copy of the requested cache line. If not, the data may be returned immediately to PND 102A along with a response having a response type of ownership-with-data, indicating that no outstanding invalidate-complete responses exist for the current request. The cache line may then be forwarded to SLC 108A in the manner discussed above. If one or more processing nodes do retain the cache line, however, SCD request channel 105 issues invalidation requests to the processing nodes in the manner discussed above. The completion of these requests is tracked by acknowledge tracker 107. Because the PRIL signal was asserted to SCD 100 along with the request, the cache line data is not returned to PND 102A until acknowledge tracker 107 indicates all invalidation operations have been completed. At this time, the data is returned to PND 102A along with a ownership-with-data response, and processing continues as discussed above.

In all of the foregoing scenarios, it was assumed that the request to processor bus 104A resulted in a processor bus miss, meaning that none of SLCs 108B –108D retained a modified copy of the requested cache line. If, instead, a processor bus hit had occurred such that one of the SLCs retains a modified data copy, processing would proceed as follows. The SLC that retained the modified copy of the requested data would invalidate its copy, and the updated cache line copy would be provided on processor bus 104A. At this time, this cache line data would also be provided to input queue 200 of PND 102A. The cache line address will be presented to cache tag logic 204 to determine whether a cache hit occurred. If so, this data will be stored within cache 206. Otherwise, if a cache miss occurred but a cache replacement operation can be performed, the cache line is stored within cache 206. If a cache miss occurred and a replacement operation is not possible, the cache line will be written to SCD 100.

In addition to being received by PND 102A, the data placed on processor bus 104A is also received by BC 114A. Because the current request was issued as the result of an ENZ instruction with the BRIL signal activated, bus priority logic 305 will discard this data, since it was returned as the result of a processor bus hit. Bus priority logic 305 then re-issues the request, which will now result in miss to processor bus 104A. The request will be received by bus control logic 201 of PND 102A. Since a processor bus miss has now occurred, PND 102A will process the request in the manner discussed above. That is, vector register 250A will be referenced to determine whether an outstanding invalidate-complete response exists for IP 110A. If so, the request will be deferred and retried until the PData vector is cleared. The addressed cache line will be retrieved from cache 206, or, if necessary, from SCD 100 during a request that asserts the PRIL signal. When the requested cache line is returned to BC 114A on processor bus 104A, it will be forwarded to IP 110A so that instruction execution may continue.

All of the foregoing scenarios are based on the assumption that the initial reference to tag logic 301 of SLC 108A results in a cache miss. Assume, instead, that the ENZ instruction results in a cache hit, but the requested cache line resides within cache memory 302 with read-only privileges. Because the ENZ instruction is a read-modify-write instruction that requires write privileges, this scenario is handled in the same manner as the cache miss case described above. That is, the request is issued to processor bus 104A with the special read-invalidate signal asserted. The request will be handled by the PND 102A as discussed above. After the invalidate vector for IP 110A clears, the write privileges will be obtained from TLC 106A, if available. Otherwise these privileges will be obtained during a request to SCD 100 that asserts the PRIL line. The requested cache line, along with write privileges, will eventually be returned on processor bus 104A by PND 102A.

In yet another scenario, the ENZ instruction results in a cache hit to cache memory 302, and the retained cache line copy is already associated with read/write privileges. Assuming that the cache line copy has not been modified within cache memory 302 as indicated by the tag logic, cache control logic 304 causes the cache line to be invalidated by updating tag information stored by tag logic 301. Cache control logic 304 then generates a request for the cache line to bus priority logic 305, and the request is handled in the manner discussed above in regards to cache miss scenarios.

Finally, the ENZ instruction may result in a cache hit, wherein the cache line has been modified within cache memory 302 of SLC 108A. In this instance, the modified cache line must be flushed to PND 102A. This is accomplished by transferring the cache line to an available one of flush buffers 307. Cache control logic 304 then generates a flush request to bus priority logic 305. When the flush operation gains priority, bus priority logic 305 controls the transfer of the cache line to an available one of write-back buffers 324 so that the data may be provided to BC 114A on interface 113A. BC 114A transfers the data to PND 102A via processor bus 104A using the appropriate bus protocol. If a cache hit occurs to TLC 106A, the cache line will be stored in this cache. Otherwise, the data will be transferred to SCD 100, as is described above.

After the cache line has been transferred to BC 114A in the manner discussed above, bus priority logic 305 signals cache control logic 304 that the ENZ request may be retried. When the request gains priority, it is re-presented to tag logic 301. The request will now result in a cache miss, and the operation can be completed as described above in regards to the cache miss scenario.

The foregoing discussion describes an ENZ instruction that activates the ENZ signal on primary interface 281. Because this signal is activated, special processing activities occur that cause the return of the requested cache line to be delayed until all PNSRI responses for the executing processor have been returned. It may be noted that any other type of instruction may be modified so that instruction execution will activate the ENZ signal. This will result in the same delayed return of data as described above. In one embodiment, activation of this signal for a given instruction is controlled by one or more programmable microcode bits stored within microcode storage device 285. As noted above, the microcode bits are used by microcode storage device to control instruction execution. In one embodiment, the ENZ signal could be used to control an IPI instruction, itself. In this embodiment, execution of the IPI instruction does not initiate the IPI until after the invalidate vector for the executing processor has cleared.

Figure 5:
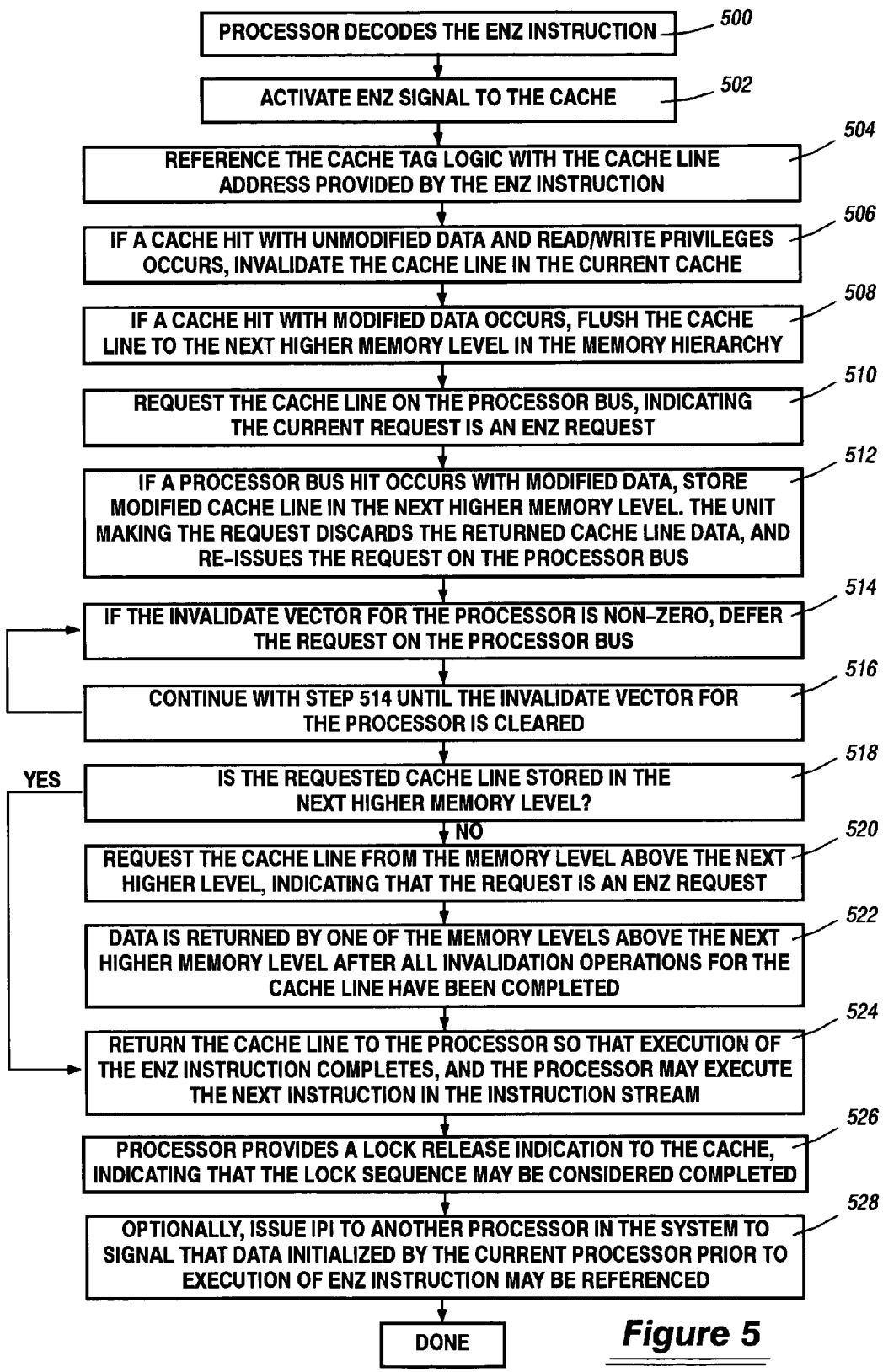
FIG. 5 is a flow diagram describing one embodiment of a method used according to the current invention.

FIG. 5 is a flow diagram describing one embodiment of a method used according to the current invention. A processor executes an ENZ instruction (500). This provides some indication to the processor's cache that an ENZ instruction has been issued (502). In one embodiment, this indication may be an ENZ signal, as discussed above. In another embodiment, this indication may be an encoded value issued via a cache interface.

Next, a reference is made to the cache for the cache line that is addressed by the ENZ signal (504). If a hit occurs with unmodified data, and read/write privileges have been granted for the cache line, the cache line is invalidated (506), and processing continues. If, however, a hit occurs with modified data, the cache line is flushed to the next higher level in the memory hierarchy (508). In all other cases, including the case of a cache miss, or a cache hit with read-only privileges, processing continues with step 510.

According to a current embodiment, a request for the cache line is issued to a processor bus that is coupled to multiple processors (510). If a processor bus hit occurs such that one of the other processors returns a modified copy of the cache line, the cache line is stored within TLC 106A of PND 102A, or alternatively, is stored back to SCD 100. This cache line data is discarded by the unit that placed the request on the processor bus. In the example above, this unit is BC 114A. Thereafter, the requesting entity re-issues the request (512).

Next, it is determined whether the invalidate vector for the executing processor is non-zero. In the current embodiment, this determination is made by PND 102A. If the invalidate vector is non-zero, the request must be deferred (514). At a later time, the unit that made the original request, which in this case is BC 114A, re-issues that request. This process will continue until the vector for the processor has been cleared (516).

After the vector for the processor has cleared, it is determined whether the requested cache line resides within the current memory level (518). In the exemplary embodiment discussed above, this current memory level includes a cache within PND 102A. This cache may be at any level in the memory hierarchy. If a cache hit occurs, the cache line is returned to the processor so that the ENZ execution may be completed, and the processor may continue execution (524). If a cache miss occurs, however, a request for the cache line is issued to the next higher level in the memory hierarchy (520). In the current example, this is the main memory, however, additional levels of memory may exist between the main memory and PND 102A.

The next higher level in the memory will return the cache line after all invalidation operations for the cache line are completed (522). Recall that within the system of FIG. 1, this processing differs from the handling of most other requests. For most requests, data is returned before invalidation operations are completed to increase processing throughput.

When the requested cache line is returned, that cache line may be returned to the processor so that the ENZ execution may be completed, and execution may continue (524). In one embodiment, the processor issues a lock release to the cache to allow the cache to clear out lock sequences occurring within its logic (526). An IPI may then be issued, if desired, to signal that data updates made by the processor may now be accessed by another processor within the system (528). Because all invalidation operations have been completed for the processor, memory incoherency will not result.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

What is claimed is:

1. For use in a data processing system having a memory coupled to multiple requesters, a memory coherency system, comprising:
   a memory circuit coupled to provide a copy of requested data from the memory to a first requester, and to initiate invalidation operations to invalidate all read-only copies of the requested data that are stored by one or more other requesters, wherein the data is provided before the invalidation operations are completed; and
   a circuit included within the first requester and responsively coupled to the memory circuit to execute an instruction that causes the first requester to temporarily enter a stalled state until all of the invalidation operations have been completed.

2. The system of claim 1, wherein the memory circuit includes a request channel and a response channel.

3. The system of claim 2, wherein the memory circuit includes an acknowledge tracker to initiate the transfer of an acknowledge to the first requester when all invalidation operations for the requested data are completed.

4. The system of claim 3, wherein the requester includes a request tracking circuit responsively coupled to the memory to record when the acknowledge is outstanding for the requested data.

5. The system of claim 1, wherein the first requester issues multiple requests, and wherein the circuit prevents any further instruction processing from occurring within the first requester until all invalidation operations have been completed for all of the multiple requests.

6. The system of claim 5, wherein the first requester is a processing node that includes multiple processors, wherein the circuit resides within one of the multiple processors and includes logic to execute an instruction to stall the processor until all of the invalidation operations have been completed for data previously provided to the processor.

7. The system of claim 5, wherein the first requester is a processing node that includes multiple processors, wherein the circuit resides within one of the multiple processors and includes logic to execute an instruction to stall the processor until all of the invalidation operations have been completed for data previously provided to predetermined ones of the processor in the processing node.

8. For use in a system having multiple requesters coupled to a shared memory, a method for controlling processing of requests, comprising:
   a.) issuing a request for data by a requester to the shared memory;
   b.) providing the data from the shared memory in response to the request before all read-only copies of the data retained by other requesters have been invalidated; and
   c.) stalling the requester until all of the read-only copies have been invalidated.

9. The method of claim 8 wherein step c.) includes the initiation by the requester of a hardware sequence to stall the requester until the read-only copies have been invalidated.

10. The method of claim 9, wherein the requester is an instruction processor, and further including execution of a predetermined instruction to initiate the hardware sequence.

11. The method of claim 10, wherein the instruction is part of the hardware instruction set of the instruction processor.

12. The method of claim 8, and including repeating steps a.) and b.) for multiple requests, and stalling the requester until all read-only copies of any data requested by any of the multiple requests have been invalidated.

13. The method of claim 8, wherein the requester is a processing node containing multiple processors, and wherein the method comprises:
   a.) issuing a request for data by one of the processors to the shared memory;
   b.) providing the data from the shared memory to the processor in response to the request before all read-only copies of the data retained by other requesters have been invalidated; and
   c.) stalling the processor until all of the read-only copies have been invalidated.

14. The method of claim 13, wherein a.) and b.) are repeated for multiple requests, and wherein step c.) includes stalling the processor until all read-only copies of any data previously provided to the processor have been invalidated.

15. The method of claim 14, herein steps a.) through c.) may be performed for more than one processor in the processing node, and wherein step c.) comprises stalling a processor until all read-only copies of any data previously provided to the processor have been invalidated.

16. The method of claim 14 wherein steps a.) through c.) may be performed for more than one processor in the processing node, and wherein step c.) comprises stalling a processor until all read-only copies of any data previously provided to predetermined ones of the processors in the processing node have been invalidated.

17. The method of claim 8, and further comprising issuing an inter-processor interrupt by the requester to another requester to indicate that data stored within the shared memory by the requester may be accessed by the other requester.

* * * * *